United States Patent

Marlow et al.

[11] 3,934,984
[45] Jan. 27, 1976

[54] GAS GENERATOR

[75] Inventors: Darrell W. Marlow, Herrin; Brady L. Freeman, Carterville, both of Ill.

[73] Assignee: Olin Corporation, New Haven, Conn.

[22] Filed: Jan. 10, 1975

[21] Appl. No.: 540,059

[52] U.S. Cl. .............. 23/281; 55/512; 280/150 AB
[51] Int. Cl.² ..................... B01J 7/00; B60R 21/08
[58] Field of Search .............. 280/150 AB; 23/281; 55/512, 522; 261/94

[56] References Cited
UNITED STATES PATENTS

| | | | |
|---|---|---|---|
| 3,006,436 | 10/1961 | Starbuck | 55/512 X |
| 3,827,715 | 8/1974 | Lynch | 280/150 AB |
| 3,845,971 | 11/1974 | Hamilton | 280/150 AB |

*Primary Examiner*—Robert R. Song
*Assistant Examiner*—John A. Pekar
*Attorney, Agent, or Firm*—Donald R. Motsko; William W. Jones

[57] ABSTRACT

A gas generator for an air bag or the like including an ignitor, a propellant, an outlet, and a cooling chamber positioned between the propellant and the outlet. The cooling chamber is filled with hollow balls with surface openings which are an effective heat sink and a trap for undesirable particulate matter so that the gas introduced into the air bag is sufficiently cool and clean to be vented into the passenger compartment of a motor vehicle.

2 Claims, 2 Drawing Figures

GAS GENERATOR

SUMMARY OF THE INVENTION

This invention relates to a gas generator for use in inflating an air bag in a motor vehicle or the like. The generator of this invention is designed to be compact in size so that it might be mounted, for example, in the steering wheel of a motor vehicle. It is designed to be a self-contained unit in that gases are generated as required upon the impact of the motor vehicle at a predetermined force without the aid of stored gases such as is disclosed in systems of the type shown in U.S. Pat. No. 3,806,153. The gases produced by a generator of the type disclosed herein are directed into an air bag and then, within a matter of milliseconds, vented into the interior of the car to prevent rebound and other undesirable effects upon the passengers. The gases must, therefore, be cool, non-toxic, and generally free from undesirable particulate matter. This invention is primarily directed to the problem of cooling the gases and filtering out undesirable particulate matter while at the same time maintaining a flow of gas from the gas generating materials to the air bag without an undesirable buildup of pressure. An undesirable buildup of pressure could occur if the portion of the generator relied upon to cool the gases an filter out particulate material is filled with a compressible or compactable substance such as steel wool, fiber felt pads, sintered metal, cloth, plastic felt, or similar materials are used such as suggested in U.S. Pat. No. 3,797,854. Such materials can compress and compact when subjected to pressure, thereby in effect closing the passageway through which the hot gases pass or partially restricting such passageways so as to cause an undesirable pressure buildup. The materials suggested in the prior art can also become clogged by the particulate substances carried by the gas and in that way cause a restriction of the free flow of gases. In certain cases, these undesirable occurrences, e.g. compression and blocking with particulate matter, can occur simultaneously, thereby causing a severe enough buildup and explosion of the gas generating unit. This could be undesirable in its effect upon the functioning of the air bag as well as the undesirable effect per se of rupturing of the generator and the possibility of metal splinters or the like affecting passengers.

In accordance with the present invention the abovedescribed undesirable features of the prior art are overcome by filling the cooling chamber of a gas generator with a number of hollow balls which in the most preferred embodiment would be spherical in shape and would have a groove or other opening formed in the surface thereof. A cooling chamber structured in accordance with the present invention would not have a tendency to restrict gas flow by compacting of the material therein. The hollow, perforated, metal balls provide a very efficient heat sink because of the great exposed surface area (inner and outer) of each of the individual balls. The perforated balls are very efficient in trapping particulate matter without restricting the flow rate.

It is therefore an object of this invention to provide a compact, efficient gas generator which includes a cooling chamber having very efficient heat absorbing characteristics and the ability to trap particulate matter without compacting and clogging.

It is a further object of this invention to provide a cooling chamber in a gas generator which includes a plurality of hollow, metal balls having a perforated surface with great cooling capacity, with little or no restricting affect upon the flow rate of gases passing through said chamber.

These and other objects and advantages of this invention will become more readily apparent from the detailed description set forth below.

DETAILED DESCRIPTION OF THE INVENTION

Figure 2:
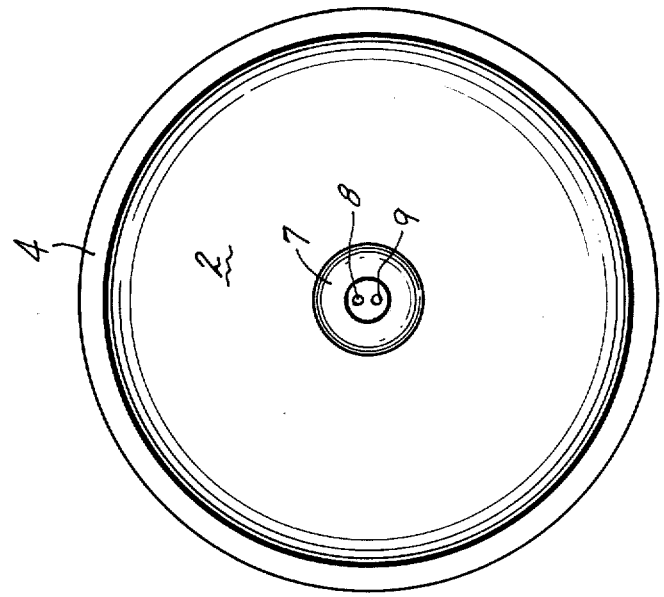
FIG. 2 is a front view of the gas generator of this invention.
Figure 1:
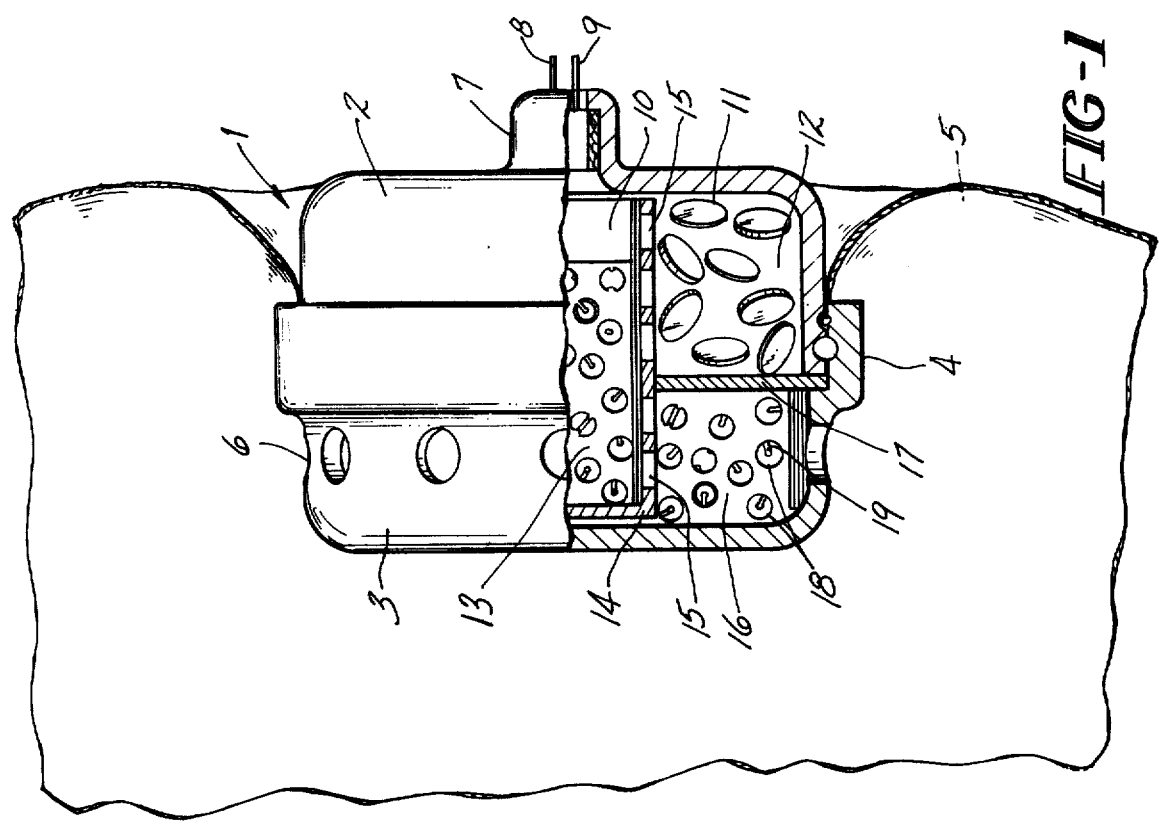
FIG. 1 is a partially cut away side view of a gas generator formed in accordance with this invention.

With reference to FIG. 1 of the invention, I show a gas generator having a housing generally indicated 1. The housing is formed in two parts which include a front cover 2 and a rear cover 3 which are joined by an overlapping lip portion 4. An air bag is trapped between the lip 4 and part of the front housing 2 so that the interior of the air bag 5 is in communication with outlets 6 formed in the rear portion 3 of the housing. Pressurized gas flowing out of openings 6 will inflate the air bag 5 when the gas generator of this invention is in operation. The front cover 2 of the housing has a nose 7 which mounts contacts 8 and 9 which are connected in a known manner to an electrical circuit in a motor vehicle. The contacts 8 and 9 are connected to or are part of an initiator such as a squib actuated by an electrical current to ignite an initiating charge 10 positioned in the housing 1 adjacent the ignitor. A propellant charge of pyrotechnic mix 11 is positioned within a propellant chamber 12 in the generator. The propellant chamber 12 is separated from a cooling chamber 13 by a cylindrical baffel 14 having a plurality of openings 15 formed therein. The interior of baffle 14 forms the main cooling chamber 13. Gases pass through the openings 15 in baffel 14 from the propellant chamber 12 into the cooling chamber 13. In the preferred embodiment shown in this invention, a secondary cooling chamber 16 is shown as being formed by a solid partition 17 between the propellant chamber 12 and rear cover 3. This arrangement provides a gas flow from the propellant chamber 12 through openings 15 into cooling chamber 13 out through rear openings 15 into secondary cooling chamber 16 and out through outlets 6 into air bag 5. As an alternative design, the cooling chamber could be a single in-line chamber adjacent to but separated from the propellant chamber by a suitable perforated wall or baffle. The interiors of the cooling chamber 13 and secondary cooling chamber 16 are provided with a plurality of hollow, metallic balls 18. Each of the balls 18 is provided with an opening 19 in its surface which is preferably an elongated slit. This allows the inner and outer surfaces of each of the balls to be exposed to the hot gases passing through the cooling chamber and also provides further efficient trapping of particulate matter within the balls 18.

It can be readily seen that upon ignition of the initiator or squib by an electrical impulse the initiating propellant and gas generating propellant are ignited to produce a hot gas. The generated gas passes through the openings 15 in the perforated wall or baffle 14 and into the cooling chamber 13. Inside the cooling chamber 13 the gases flow around and inside the balls 18 which provide a very efficient heat sink in absorbing heat from the hot gases. Particulate matter from the gases is deposited on the surface of the balls and inside the balls because of the perforations formed therein. The gases pass back through openings 15 into the secondary cooling chamber 16 where they are further cooled and cleaned. The cooled and cleaned gases then pass out through opening 6 in the rear cover 3 and into the interior of air bag 5. The air bag is inflated to prevent injury to an occupant inside a motor vehicle.

What is claimed is:

1. A gas generator for an inflatable occupant restraint comprising a housing, a propellant chamber in said housing, a gas generating charge in said chamber, means for igniting said charge in response to a predetermined signal, an outlet in said housing for the expulsion of gases formed upon igniting and burning of said charge, a cooling chamber formed between said propellant chamber and said outlet, said cooling chamber including a plurality of hollow, metallic balls each having an opening through the surface thereof.

2. The generator of claim 1 in which said balls are spherical and hollow with a slit through the surface to provide maximum exposed surface for heat absorption and a trap for solid particles in said gases.

* * * * *

UNITED STATES PATENT OFFICE
CERTIFICATE OF CORRECTION

Patent No. 3,934,984                    Dated January 27, 1976

Inventor(s) Marlow & Freeman

It is certified that error appears in the above-identified patent and that said Letters Patent are hereby corrected as shown below:

Col. 1, line 27, please delete "an" and insert --and--;

Col. 1, line 61, please insert after "balls" the word --also--;

Col. 2, line 22, after "bag" please insert --5--;

Col. 2, line 35, please delete "of" and insert --or--;

Signed and Sealed this eighth Day of June 1976

[SEAL]

Attest:

RUTH C. MASON
Attesting Officer

C. MARSHALL DANN
Commissioner of Patents and Trademarks